June 18, 1957     L. I. HALL     2,795,955
LIQUID LEVEL GAUGE
Filed Sept. 2, 1955

INVENTOR.
LEONARD I. HALL
BY
ATTORNEY

United States Patent Office 2,795,955
Patented June 18, 1957

2,795,955
LIQUID LEVEL GAUGE

Leonard I. Hall, Rochester, N. Y., assignor to Rochester Manufacturing Company, Inc., Rochester, N. Y., a corporation of New York Application September 2, 1955, Serial No. 532,266

3 Claims. (Cl. 73—317)

The present invention relates to gauges and more particularly to liquid level gauges. In a still more specific aspect, the invention relates to an improvement in liquid level gauges of the type shown and described in Patent No. 2,630,715, issued March 10, 1953.

In the past, the size of the indicator used on liquid level gauges was limited because it was fixedly secured to the body portion of the gauge and had to be kept to a diameter to permit access to the screws used for fastening the gauge of the tank or other liquid container on which it was used. This drawback was overcome by the liquid level gauge disclosed in the above mentioned patent, wherein the indicator is made separate from the gauge body. Means is provided so that the indicator may be detachably connected to the gauge body and properly oriented therewith. As a result, it is possible to first connect the gauge body to a liquid tank and then to detachably connect the indicator to the gauge body. With this construction, the indicator can be made of any size regardless of the size of the gauge body.

One object of this invention is to provide a liquid level gauge of the type disclosed in Patent 2,630,715 having improved means for detachably connecting the indicator portion of the gauge to the body portion of the gauge.

Another object of this invention is to provide connecting means of the character described which is of simpler construction than that shown in the above-mentioned patent, thereby permitting assembly of the gauge in the field without the exercise of any great skill and without the use of tools.

A further object of this invention is to provide a liquid level gauge which can be manufactured at lower cost than the gauge described in the above-mentioned patent by virtue of this simpler construction.

Other objects of this invention will be apparent hereinafter from the specification and from the recital of the appended claims.

Figure 1:
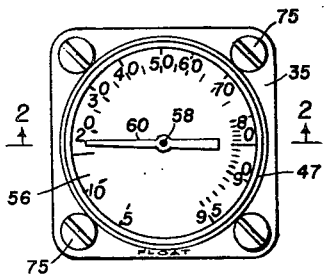
Fig. 1 is a plan view of a gauge constructed according to one embodiment of this invention.

The actuating mechanism of the gauge is of conventional construction and similar to that described in Patent 2,630,715. It comprises a float 10 carried at one end of an arm 11, to the opposite end of which is connected a counter-weight 12. The arm is pivoted by means of a clip member or plate 14 on a stud 15. Clip 14 is attached to a gear segment 16 that meshes with a spur gear 18. Stud 15 is secured against rotation in the furcations of a yoke 20 that has two diametrically opposed, upturned, tongues 21 which are riveted or otherwise secured to a tubular supporting post or column 22. Spur gear 18 is fixedly connected to a shaft 24 which is journaled at its lower end in stud 15. Shaft 24 extends upwardly through a hole in yoke 20. Adjacent its upper end shaft 24 is journaled in a cup-shaped bearing member 25 that is pressed into the upper end of post 22. Shaft 24 extends beyond the upper end of tube 22 and has a magnet 27 secured to it.

Mounted on the upper end of post 22 is a cup-shaped member 30. Spot-welded or otherwise connected to member 30 is a gauge head 35 which closes member 30. Head 35 is recessed on its upper face at 36. A collar 38 having an inturned flange 39 at its lower end seats in recess 36 and is rigidly affixed to head 35 by spot-welding or other means. Collar 38 is made of sheet metal and has some slight resiliency.

An indicator unit 45 is adapted to be mounted in collar 38. It comprises a cup-shaped member 46 formed with a bezel 47 at its upper end. The base 50 of cup 46 has a pin 51 riveted to it. A hub member 52 is journaled on the pin and secured to the hub is a disc magnet 55. Seated on bezel 47 is an indicator dial 56. The indicator dial has a central opening through which a portion 58 of hub 52 projects. Secured to portion 58 is a needle or pointer 60. The indicator unit is enclosed by a sight glass or crystal 62 which is held in place by bezel 47.

Figure 3:
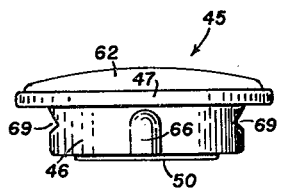
Fig. 3 is a side elevation of the removable indicator chamber.
Figure 2:
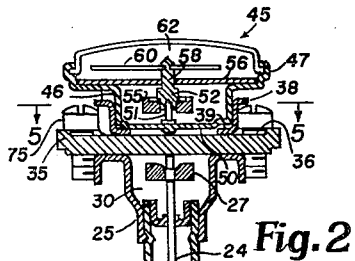
Fig. 2 is a vertical section through the gauge taken on the line 2—2 of Fig. 1 and looking in the direction of the arrows, portions of the float and the counter-weight being broken away.
Figure 4:
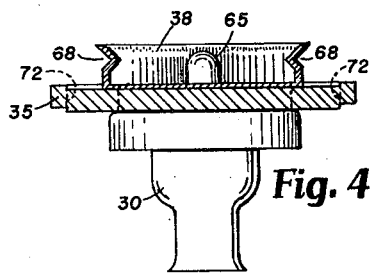
Fig. 4 is a fragmentary axial section of the body portion of the gauge with the indicator chamber removed.

In order that indicator unit 45 may be angularly located on gauge head 35, collar 38 is provided with an internal tongue 65 (Fig. 4) and member 46 of the unit is provided with a peripheral groove 66 (Fig. 3). Tongue 65 and groove 66 extend axially. Thus, when unit 45 is inserted in collar 38 with the tongue and groove 65 and 66, respectively, in register, the indicator unit is keyed in proper position with respect to the position of needle 60 in relationship to the position of float 10 and rotary movement of the unit is prevented.

Figure 5:
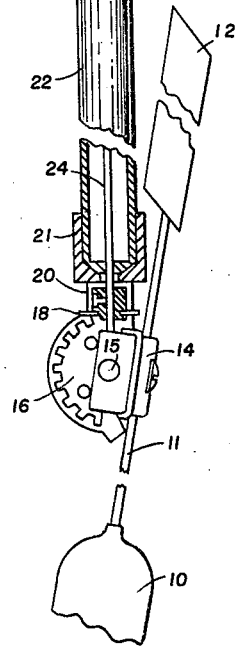
Fig. 5 is a section taken on the line 5—5 of Fig. 2 and looking in the direction of the arrows.
Figure 5:
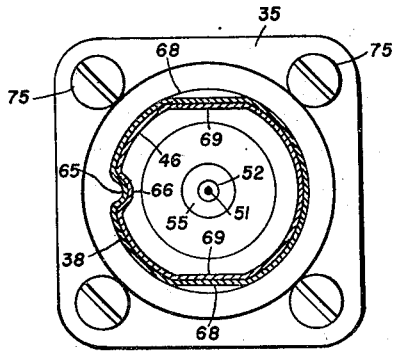

To detachably hold the indicator unit 45 within collar 38, the collar is provided with a pair of inwardly projecting tongues 68 (Fig. 4) at diametrically opposite sides of the collar and spaced 90° from keying tongue 65. Member 46 of unit 45 is provided with a pair of diametrically opposite peripheral grooves 69 spaced 90° from groove 66 and adapted to receive tongues 68. As shown in Fig. 5, the tongues 68 and grooves 69 extend on a plane perpendicular to the axis of the gauge. Outward movement of unit 45 is therefore resisted once it is pressed with collar 38.

Head 35 is provided with four holes 72 through which bolts 75 may be passed to connect the gauge to the tank on which it is mounted. With the structure of the present invention the bolts are readily accessible (Figs. 1 and 5). Therefore, they are readily removable if it is desired to remove the gauge.

With the above construction, indicator unit 45 is quickly and easily mounted on the gauge head merely by bringing tongue 65 and groove 66 into register and then pressing the unit into collar 38 to snap it into place. Collar 38 is sprung outwardly as the unit is inserted, by member 46 of the unit which engages tongues 68. When the tongues 68 and grooves 69, on the collar 38 and member 46, respectively, come into register the tongues enter the grooves and the indicator unit is thereby securely held in place.

It will be apparent that a gauge constructed as previously described can be quickly and easily assembled. The gauge mechanism and its attached head portion can be shipped separately from the indicator unit. In the field, thereafter, the indicator unit can be mounted in place without the exercise of skill or the use of tools.

In addition to ease of assembly, the liquid level gauge construction just described is easier to manufacture than the liquid level gauge shown in the patent previously referred to. Collar 38 and cup-shaped portion 46 of the indicator unit can be quickly and easily manufactured from sheet metal.

Since the indicator is a separate unit, it will be apparent that its dial may be made of any desired size and is not restricted to the size of the gauge head. The dials of gauges made according to this invention can, therefore, be made so that they can be readily read. Further, the indicator unit can readily be removed from collar 38 by pulling it outwardly against the resilient force of the cooperating parts, or by using a screw-driver or similar instrument to pry the indicator from the collar 38.

While this invention has been described in connection with a liquid level gauge, it will be obvious that it may be applied to other forms of gauges. Further, while the invention has been described in connection with a particular embodiment thereof, it will be understood that it is capable of various modifications and uses, and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gauge comprising a body closed at its top, a condition-responsive member movably mounted in said body, a magnet connected to said condition-responsive member to move therewith, a collar fixedly mounted on the upper end of said body, an enclosed indicator unit adapted to be mounted within said collar, said unit comprising a cylindrical cup-shaped member, an indicator dial and an indicator needle, one of the two latter parts being movable in the unit by magnetic attraction on movement of said magnet, and a sight glass mounted on said cup-shaped member to close it, means for locating said unit angularly with respect to said collar and to prevent rotation of one relative to the other when the unit is mounted in the collar comprising a tongue on one of the parts extending on an axis parallel to the axis of said unit and interengaging in a groove in the other of the parts, extending along the same axis, and means for holding said unit within said collar comprising at least one interengaging tongue and groove connection extending on a plane perpendicular to the axis of said unit.

2. A gauge comprising a body closed at its top, a condition-responsive member movably mounted in said body, a magnet connected to said condition-responsive member to move therewith, a collar fixedly mounted on the upper end of said body, an enclosed indicator unit adapted to be mounted within said collar, said unit comprising a cylindrical cup-shaped member containing an indicator dial and an indicator needle, one of the two latter parts being movable in the unit by magnetic attraction on movement of said magnet, and a sight glass mounted on said cup-shaped member to close it, said cup-shaped member having a peripheral groove extending parallel to the axis of said unit, said collar having an internal tongue extending in the same direction, and adapted to engage in said groove when said unit is positioned within said collar to thereby locate said unit angularly with respect to said collar and to prevent rotation of one relative to the other, and tongue and groove means spaced angularly from said first named tongue and groove and extending on a plane perpendicular to the axis of said unit for preventing removal of said unit from said collar.

3. A gauge comprising a body closed at its top, a condition-responsive member movably mounted in said body, a magnet connected to said condition-responsive member to move therewith, a collar having some resiliency fixedly mounted on the upper end of said body, an enclosed indicator unit adapted to be mounted within said collar, said unit comprising a cylindrical cup-shaped member containing an indicator dial and an indicator needle one of the two latter parts being movable in the unit by magnetic attraction on movement of said magnet, and a sight glass mounted on said cup-shaped member to close it, said cup-shaped member having a groove in its periphery extending parallel to the axis of said unit and a pair of elongate grooves also in said periphery at diametrically opposite sides thereof and angularly spaced from said first groove, said pair of grooves extending in a plane perpendicular to the axis of said unit, said collar having an internal tongue adapted to engage in the first groove in said cup-shaped member when said unit is in position within said collar to thereby locate said unit angularly with respect to said collar and to prevent rotation of one relative to the other, said collar also having a pair of internal tongues spaced at the same angular distance from said first tongue as said pair of grooves are from said first groove and adapted to engage therewith to hold said unit within said collar, the outside diameter of said cup-shaped member being substantially equal to the inside diameter of said collar, thereby requiring said unit to be inserted under force into said collar.

References Cited in the file of this patent

UNITED STATES PATENTS

| | | |
|---|---|---|
| 2,311,387 | Hastings | Feb. 16, 1943 |
| 2,584,446 | Hastings | Feb. 5, 1952 |
| 2,630,715 | Hall | Mar. 10, 1953 |